Nov. 25, 1941.    J. P. SPANG    2,263,855
MEAT-SLITTING MACHINE
Original Filed May 9, 1939
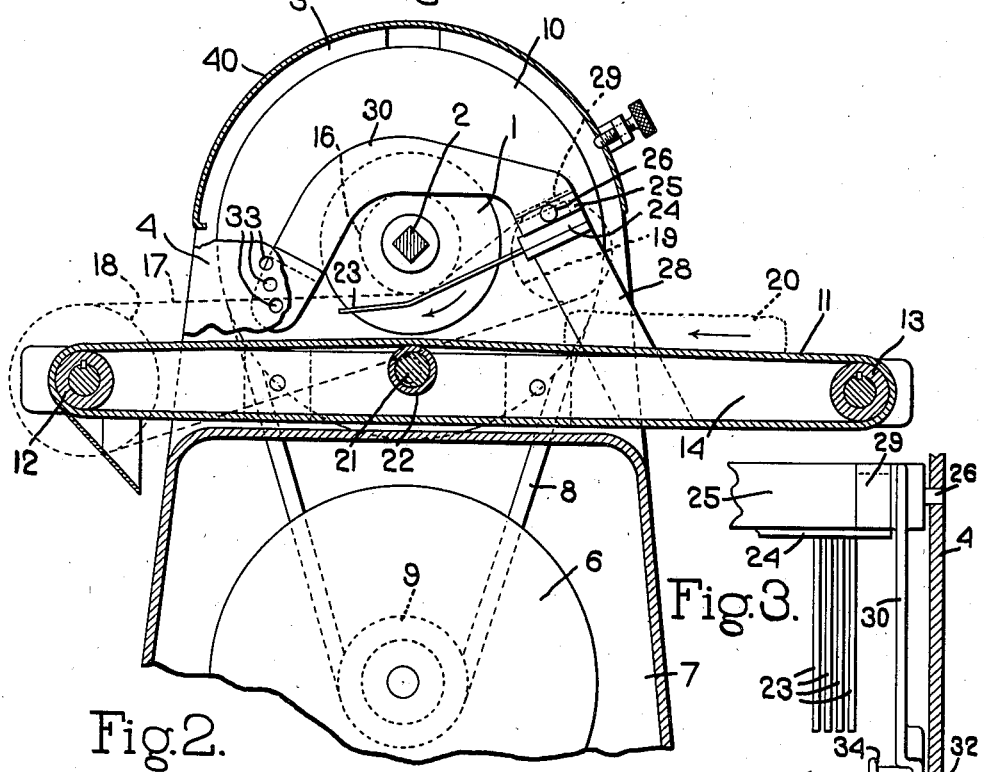
Fig. 1.
Fig. 2.
Fig. 3.
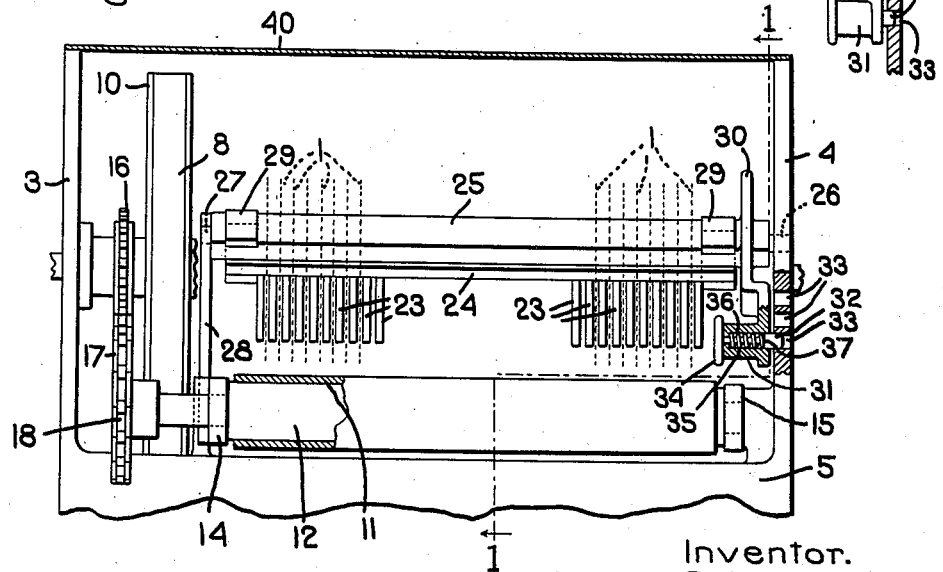
Inventor.
Joseph P. Spang
by Heard Smith & Tennant.
Attys.

Patented Nov. 25, 1941

2,263,855

UNITED STATES PATENT OFFICE 2,263,855

MEAT-SLITTING MACHINE

Joseph P. Spang, Quincy, Mass., assignor to Cube Steak Machine Company, Inc., Boston, Mass., a corporation of Massachusetts Original application May 9, 1939, Serial No. 272,602. Divided and this application March 4, 1940, Serial No. 322,154

2 Claims. (Cl. 17—25)

This invention relates to meat-slitting machines of that type comprising a set of rotary slitting knives, together with means for feeding a slice of meat to said knives.

The present invention relates particularly to the stripper mechanism which is employed to hold the meat on the meat support while the knives are slitting the meat and to strip the meat from the knives as it is delivered therefrom.

In order to give an understanding of the invention, I have illustrated in the drawing a selected embodiment thereof which will now be described, after which the novel features will be pointed out in the appended claims.

In the drawing:

Fig. 1 is a vertical sectional view through a meat-slitting machine embodying my invention, the section being taken on substantially the line 1—1, Fig. 2.

Fig. 2 is an end view of Fig. 1, with the cover plate shown in section.

Fig. 3 is a fragmentary sectional view showing one end of the stripper assembly in plan.

In the drawing, the rotary knives by which the slits are cut in the slice of meat are indicated at 1, said knives being mounted on a knife shaft 2 which is journaled in upright portions 3 and 4, with which the frame 5 of the machine is provided. The means for rotating the knives comprises a motor 6 which is housed in the lower portion 7 of the frame and which is connected to the knife shaft by means of a drive belt 8 which runs over a pulley 9 on the motor shaft and another larger pulley 10 on the knife shaft.

The means for supporting the meat and feeding it to the knives is herein illustrated as an endless belt 11 which passes around supporting rolls 12 and 13 that are mounted in two side rails 14, 15 that extend between upright portions 3 and 4 of the frame and are suitably secured together and to the frame.

This endless apron 11 may be driven in any appropriate way, and I have herein illustrated means by which it may be driven from the knife shaft 2. For this purpose, the knife shaft 2 is provided with a sprocket wheel 16 which engages the upper run of an endless sprocket chain 17, said chain passing around a sprocket wheel 18 which is rigid with the roll 12 and also around an idler sprocket wheel 19 which is suitably mounted in the frame. With this driving connection between the knife shaft and the apron 11, the rotation of the knife shaft clockwise in Fig. 1 will serve to move the upper run of the feed apron from the right toward the left, thus carrying the meat from right toward the left. A slice 20 of meat placed on the input or righthand end of the feed apron 11 will be carried thereby beneath the knives, which will cut slits in the upper face of the meat.

The portion of the apron directly beneath the knives and on which the slice of meat is supported while it is being acted on by the knives is supported by an apron support in the form of a rod 21 which is carried by the two side rails 14, 15, and on which is loosely mounted a sleeve 22. The sleeve 22, which is freely turnable on the rod 21, thus provides a rolling support for the upper run of the apron 11.

The rod 21 may be mounted eccentrically in the side rails 14, 15, so that a turning of the rod in the rails will adjust the apron toward or from the knives, thereby providing for varying the depth of the slits which the knives make in the meat.

The construction thus far described is similar to that illustrated in my co-pending application, Serial No. 272,602, filed May 9, 1939, of which this application is a division.

Associated with the knives is a stripper assembly for holding the meat against the apron 11 while it is being acted on by the knives and for stripping the slit slice from the knives.

This stripper assembly comprises a plurality of stripper fingers 23 which are preferably more or less resilient and which are carried by a head 24 that is pivotally mounted to provide for swinging the fingers 23 toward or from the apron 11. In the illustrated construction, this head 24 which carries the stripper fingers is detachably mounted on a supporting bar 25 which has at each end a trunnion, one trunnion 26 being journaled in the upright 4 and the other trunnion 27 being journaled in a bracket arm 28 which is secured to and rises from the side rail 14. The head 24 carrying the stripper fingers 23 is provided at each end with a hook portion 29 adapted to embrace the supporting bar 25, the construction being such that the head 24 with its stripper fingers can be readily withdrawn from the supporting bar 25 in case it is desired to remove the stripper from the machine.

The bar 25 has rigid therewith at one end an arm 30 which extends over the knife shaft 2 and to a point on the opposite side thereof from the supporting bar 25. This arm is shown as lying just inside of the upright 4.

The outer end of the arm 30 is formed with a boss 31 which carries a spring-pressed locking pin 32 adapted to engage any one of a number of apertures 33 with which the upright 4 is provided. The locking pin 32 extends axially through the boss 31 and is provided on its inner end with a head 34 by which it may be manipulated. Said pin is acted on by a spring 35 which is confined in a recess 36 within said boss and which bears at one end against a shoulder 37 with which the pin is provided and at the other end against the inner end of the recess 36, said spring thus urging the locking pin to the right, Fig. 2.

The above construction provides a simple means for adjusting the stripper fingers 23 toward and from the apron 11 and for locking the stripper assembly in any adjusted position.

The particular position into which the stripper fingers 23 will be adjusted will depend upon the thickness of the slices of meat that are being slit. If the slices are relatively thick, the arm 30 will be adjusted to raise the stripper fingers slightly, while if the slices are relatively thin, said arm will be adjusted to lower the stripper fingers. These stripper fingers not only apply appropriate pressure against the upper surface of the meat while it is being acted on by the knives, but they also hold the meat on the apron and prevent it from being lifted off from the apron by the rapidly rotating knives.

The driving mechanism for the knives and the apron will be such that the peripheral speed of the knives will be greater than the forward feeding movement of the apron 11 so that said knives will act on the meat with a draw cut.

I claim:

1. A meat-slitting machine comprising a frame having an upright at each end, a set of rotary knives mounted in said upright, means to rotate the knives, means for feeding a slice of meat to the knives, a stripper assembly comprising a head pivotally mounted at one side of the knives, stripper fingers carried by the head and adapted to bear against the slice of meat as it is being acted on by the knives, an arm connected to said head and extending across the knives and by which the head may be turned to adjust the stripper fingers vertically, said arm being situated adjacent one of the uprights, and means providing an interlocking engagement between the arm and said upright for locking the arm in adjusted position.

2. In a meat-slitting machine, a frame having an upright at each end, one of which is provided with locking apertures, a knife shaft journaled in said uprights, a set of rotary knives carried by the knife shaft, means to rotate the knife shaft, a stripper assembly comprising a head pivotally mounted in the frame on the input side of the knives, a plurality of stripper fingers carried by the head and extending between the knives, an arm connected to the head at one end thereof and extending to the opposite side of the knife shaft from that occupied by the head, said arm being situated close to the uprights having the apertures and providing means for turning the head to adjust the stripper finger vertically, and a spring-pressed locking pin carried by the arm and adapted to engage in one of the apertures, thereby to lock the arm in adjusted position.

JOSEPH P. SPANG.